United States Patent Office 3,839,407
Patented Oct. 1, 1974

3,839,407
CLEAVAGE OF ENOL ETHERS AND KETALS
Milorad M. Rogic, Whippany, and John Vitrone, Parsippany, N.J., assignors to Allied Chemical Corporation, New York, N.Y.
No Drawing. Continuation-in-part of abandoned application Ser. No. 274,016, July 21, 1972. This application Feb. 28, 1973, Ser. No. 336,570
Int. Cl. C07c 121/02
U.S. Cl. 260—465.4         9 Claims

ABSTRACT OF THE DISCLOSURE

Acid-catalyzed nitrosolysis (i.e. cleavage by action of a nitrosating agent) of the bond joining a ketal group and a methylenic carbon atom, in presence of polar aprotic solvent and alcohol. A cyano group and an ester group are produced, which are connected by a chain of atoms when the said bond was part of a ring, to form a cyano ester. Such cyano ester provides a route to polymerizable dibasic acids, diamines, and amino esters, amino acids, and lactams.

CROSS REFERENCE TO RELATED APPLICATION

This application is a continuation-in-part of our U.S. application Ser. No. 274,016, filed July 21, 1972, now abandoned.

BACKGROUND OF THE INVENTION

I. Field of the Invention

This invention relates to cleavage of a bond in a ketal which joins the ketal group, i.e. $C(OR)_2$, and a methylenic carbon atom. The cleavage is effected in this invention by action of a nitrous acid ester, catalyzed by an acid, in a polar aprotic solvent containing alcohol (preferably primary) added thereto and/or formed therein. The invention includes use of enol ethers as starting materials from which the said ketals (also called ketone acetals) are formed in situ; and includes cleavage of the enolic double bond of such enol ether.

II. Description of the Prior Art

It is known in the prior art to use nitrosation as a first step in cleaving the enolic double bond connecting two carbon atoms, one bearing an ether group and the other being tertiary, i.e. both its single bonds being attached to other carbon atoms. For such bond cleavage, a reagent such as nitrosyl chloride is added in the cold in a solvent such as ether; and an alcohol is subsequently added to the cold reaction mixture. The reaction product contains oxime hydrochloride, ester, and alkyl chloride. (Chemical Abstracts, volume 72 of 1970—78319s.) Reaction under like conditions of nitrosyl chloride with alpha-unsaturated ketals (ketene acetals) is also known, forming nitrosyl chloride addition products without cleavage. (Chemical Abstracts, volume 64 of 1965—3343g.)

Various solvents have been used in the prior art for nitrosation reactions. Specifically sulfur dioxide, which is preferred solvent in present invention, has been used. In particular Allied Chemical Corporation Belgium Pat. 754,033 laid open December 31, 1970 describes use of sulfur dioxide solvent in reaction of methyl nitrite with 2-nitrocyclohexanone in presence of a several-fold molar excess of hydrochloric acid. Thereby an oxime group is substituted into the 6-position of the cyclohexanone ring. (Subsequent addition of alcoholic base effects cleavage between the keto group and the carbon bearing the nitro group, in the 2-position of the ring.)

SUMMARY OF THE INVENTION

It is known that ketones can be converted into ketals and that the ketals can in turn be converted to enol ethers and vice versa. By the present invention the bond to a methylenic carbon atom alpha to the keto group, after conversion of the ketone to a ketal or enol ether, can be cleaved. The resulting product, generally obtainable in good yield, bears an ester group at the site of the ketal or enolic ether group and a cyano group instead of the methylenic carbon atom originally attached to the bond cleaved in our process. Esters have utility as solvents, in perfumery, for conversion to acids etc. and nitriles (organic cyano compounds) are useful as solvents and for conversion to organic acids, amines, etc.

A particular utility of the present process is for cleavage of cyclic ketones to form omega-cyano esters which can be converted to polymerizable amino esters, amino acids, or lactams; to polymerizable diamines, and to polymerizable dibasic acids.

In the process of the invention the principal reactant is a ketal, or the corresponding enol ether, in which any substituents are aprotic (i.e. neither donate nor accept a proton); and in which ketal at least one of the two carbon atoms attached to the ketal group is methylenic, i.e. bears two hydrogen atoms. In accordance with the invention a reaction mixture is formed by providing such ketal in a reaction medium comprising an effective proportion of a polar aprotic solvent. This solvent must be substantially inert per se at the reaction temperature to the ketal and as a polar solvent, it should have a dielectric constant of at least about 12 at the reaction temperature. Preferably, to avoid side reactions, this solvent should be anhydrous.

Additionally there are provided in said reaction medium: (1) nitrous acid ester (also called "nitrite" below) in amount not greater than about 2 molar equivalents per mole of unreacted ketal provided; (2) acid capable of promoting consumption of said nitrous acid ester under the reaction conditions in total amounts not greater than about one equivalent per mole of total nitrite provided in the reaction mixture; and (3) alcohol, preferably a primary alcohol having at least 2 carbon atoms, in amount including such as is formed in the reaction and such as is added to the mixture, of at least about ½ equivalent per mole of ketal provided in the reaction mixture; and subjecting the reaction mixture to temperature and time sufficient for producing cleavage in said reaction mixture at the said bond to said ketal group, with formation of a cyano group and an ester group at the point of cleavage.

The term "providing" a designating material is intended herein as a generic term embracing addition of the designated material as such to the reaction medium or reaction mixture and/or addition to the reaction medium or mixture of a precursor from which the designated material is formed in situ. Specifically enol ethers generate ketals under our reaction conditions. Nevertheless we theorize that the enol ether form is the reactive species, even though present as such in undetectably low concentration in our reaction mixtures. Accordingly the term "providing a ketal in a reaction medium" as used herein covers introduction of an enol ether as starting material into the reaction medium and also introduction of the corresponding ketal into the reaction medium; from which the said enol ether formed by splitting out an alcohol group.

Also in our reaction mixtures, the combination of a nitroso compound such as nitrosyl chloride plus an alcohol is a precursor of a nitrous acid ester; and a nitrous acid ester plus an acid is a precursor of an alcohol. The above relationships are due to equilibria illustrated by the following equations:

(1)
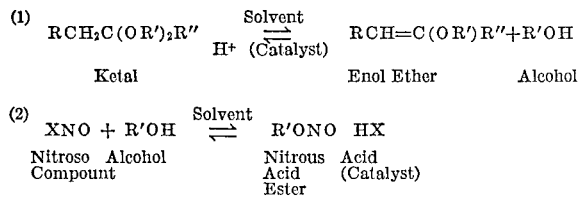
Ketal             Enol Ether     Alcohol (2)
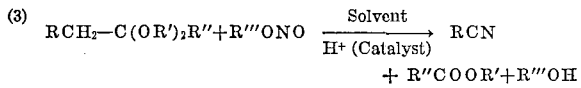
Nitroso Alcohol Compount    Nitrous Acid Ester (Catalyst)

DESCRIPTION OF THE PREFERRED EMBODIMENTS

Our overall process can be represented by the equation:

(3)

$$RCH_2-C(OR')_2R''+R'''ONO \xrightarrow[H^+ \text{ (Catalyst)}]{\text{Solvent}} RCN + R''COOR' + R'''OH$$

In view of the above equilibrium equation (1) it will be appreciated that the alcohol product, $R'''OH$ may react with $RCH=C(OR')R''$ to form the ketal, $$RCH_2C(OR')(OR''')R''$$

which in turn may produce in situ the enol ether $RCH=C(OR'')R''$. The nitrous acid ester $R'ONO$, also, can provide its alcoholic group in the ester cleavage product via alcohol produced per equation (2). Accordingly, the organic radical in any alcohol present will appear in some of the final ester product obtained while in the balance, the organic radical of the original ether group in the enol ether reactant and that of the nitrite may appear. If these organic radicals are different, the ester product in general will be a mixture containing at least the various primary alcoholic groups in the components of the reaction mixture.

Reaction temperatures suitable in our process extend over a considerable range but should not be raised so high as to promote side reactions of decomposition. Suitable temperatures will usually be found in the range between (—70° C.) and the boiling point of the solvent under the prevailing pressure. When a low-boiling solvent such as sulfur dioxide is used, the pressure in the reaction zone must of course be high enough to maintain a liquid phase containing the solvent at the prevailing reaction temperautre. Of course the temperature should not be so low as to freeze the solvent. Suitable temperatures conveniently used are usually found in the range between (—20° C.) and (+50° C.).

The ketals and enol ethers employed as reactants in our process are obtainable in known manner from ketones. A suitable procedure is described in literature article by U. Schmidt and P. Grafen, in Annalen Der Chemie, Vol. 656 of 1962, pages 97–102 at pages 100–101. Preferably the ketal or enol ether employed contains no site reactive under the conditions employed, except the ketal group or enolic double bond.

Referring again to equation (1) above it will be appreciated that when the group $R''$ is $—CH_2X$ in the ketal there shown, then the radical X as well as the radical R is attached to the ketalic carbon atom by a methylene group; the ketal is $RCH_2C(OR')_2CH_2X$. When R and X are different, two enol ethers (each giving a different pair of nitrosolysis products) will be provided by this ketal by splitting out an alcohol molecule per the equation:

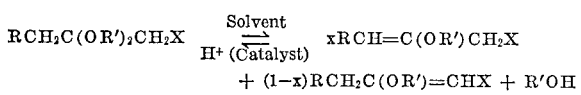

$$RCH_2C(OR')_2CH_2X \xrightleftharpoons[H^+ \text{ (Catalyst)}]{\text{Solvent}} xRCH=C(OR')CH_2X + (1-x)RCH_2C(OR')=CHX + R'OH$$

On the other hand when both R and X are the same, i.e. when the ketal is symmetrical, then only one enol ether, and one pair of nitrosolysis products, is formed in our process, as will usually be desirable.

Of course if $R''$ will not contribute to the splitting out of alcohol, e.g. when $R''$ is phenyl or tertiary alkyl again only one enol ether will be provided by the ketals.

Coming to the ether groups of the ketal it will frequently be desirable that the groups $R'$ thereof in the formula of equation (3) above should be attached to the ether oxygen atom through a primary carbon atom. As above noted, an alcohol (preferably primary and having at least two carbon atoms) is provided in our reaction mixture; and when such primary alcohol is to come from either ketal by equation (1) or from the nitrous acid ester equation (2), the ketal and/or nitrous acid ester and the compounds formed therefrom will contain the primary alcoholic group.

Moreover when a primary alcohol is separately added to the reaction mixture, use of that same primary alcoholic group in the ketal or the enol ether and in the nitrous acid ester will lead to a single ester product instead of a mixture.

It is convenient to utilize as sources of primary alcohol, compounds containing alkyl groups of relatively low molecular weight such as $C_2-C_{12}$ primary alkyl groups. Specifically alcoholic groups all of the same carbon content and selected from ethyl, normal propyl, or one or both primary butyl radicals (normal and iso-) advantageously constitute the alcoholic group of the ketal or enol ether, and the ntirous acid ester, and the added alcohol.

Referring now to the polar aprotic solvent, this solvent should be incapable of giving up protons and should also be nonbasic. Investigation of various solvents indicates that the dielectric constant should be at least 12 under reaction temperature. Specific solvents which are effective are sulfur dioxide, organic sulfones, and organic nitro compounds. The amount of such solvent used should be an effective amount for purposes of bringing about the desired course of reaction. In general this solvent will be present in amount of at least about half the weight of the reaction mixture.

Referring to the proportion of nitrous acid ester with respect to the ketal reactant, we have found that a large excess of the ester tends to cause side reactions and should be avoided. Accordingly the amount of nitrous acid ester provided is not greater than about 2 molar equivalents per mol of ketal provided, and preferably the amount of unreacted nitroso group present in the reaction mixture does not exceed the amount needed to provide one equivalent of unreacted nitroso group for each mol of unreacted ketal in the reaction mixture. Suitably the nitrite is introduced into the reaction mixture in small increments, e.g. dropwise in solution in alcohol. As indicated by equation (2) above, such nitroso group can be provided by nitrous acid ester as such and/or by a nitroso compound such as nitrosyl chloride functioning together with an alcohol as a nitrous acid ester precursor in the reaction mixture.

An acid is provided as catalyst, capable of promoting consumption of nitrous acid ester under the reaction conditions. To avoid side reactions, in particular the production of an oximino group instead of a nitrile, the total amount of acid added to the reaction mixture is not greater than about one equivalent per mol of total nitrite provided in the reaction mixture, and preferably is in the range of about 1 equivalent to about 10 equivalents of acid per 100 mols of total nitrite provided in the reaction mixture.

As also stated above, an alcohol, preferably primary and having at least 2 carbon atoms, is provided in the reaction mixture. Preferably at least about 2 mols of such primary alcohol are provided in the reaction mixture per mol of ketal provided in the reaction mixture, in order to promote the desired nitrosation cleavage reaction versus side reaction.

The effect of catalytic acid and of alcohol in promoting the desired cleavage reaction can be formulated as shown in equations 4(a), (b), (c) below. However it is to be understood that we do not intend to confine our invention to any particular formulation or theory thereof.

(The bonds indicated by dashes represent bonds in transition stages of formation or cleavage.)

(4) Formulation of the reaction:

(a) $$RONO + H^{\oplus} \longrightarrow NO^{\oplus} + ROH$$

(b) 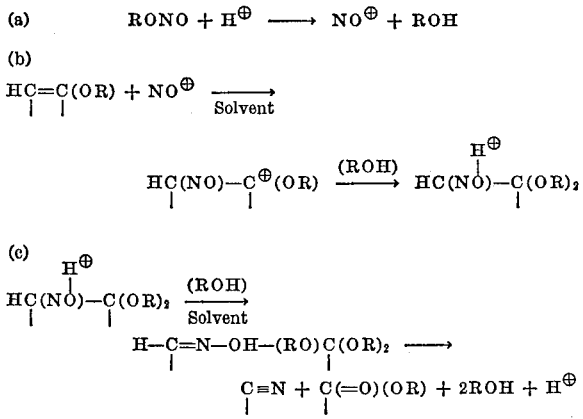

(c)
$$\underset{|}{HC(N\overset{H^{\oplus}}{O})}-\underset{|}{C(OR)_2} \xrightarrow[\text{Solvent}]{(ROH)}$$
$$H-\underset{|}{C}=N-OH-(RO)\underset{|}{C}(OR)_2 \longrightarrow$$
$$\underset{|}{C}\equiv N + \underset{|}{C}(=O)(OR) + 2ROH + H^{\oplus}$$

It will be noted that the acid catalyst, represented in (4)(a) above by $H^{\oplus}$, is regenerated in (c); and the alcohol consumed in (b) and in the first stage of (c) is regenerated. Besides being a promoter or catalyst, the alcohol also has the effect of shifting the equilibrium shown in equation (1) above toward the left, thereby reducing the enol ether concentration in the reaction mixture. Up to a point this is beneficial in reducing side reactions such as that between enol ether and sulfur dioxide. However if the alcohol forms too stable a ketal, then the enol ether concentration is insufficient for the desired nitrosation cleavage reaction to proceed. Methanol is an example of an alcohol which forms relatively stable ketals, too stable in some cases for the desired reaction to proceed readily. Accordingly in general the primary alcohol to be present will preferably have at least 2 carbon atoms in the molecule.

On the other hand if the alcohol is secondary or tertiary it may not react sufficiently readily by addition per 4(b), 4(c) at the enolic double bond. In that case the desired cleavage reaction will not occur. Accordingly a primary alcohol desirably is provided in our reaction mixture in at least the minimum amount of ½ equivalent per mol of ketal provided therein, as has been indicated above. Among primary alcohols ethanol, normal propanol, normal butanol and isobutanol have been found to be particularly suitable for use in this invention.

We have found that the acid catalyst need not necessarily be a hydrogen-containing acid, but more generally may include the Lewis acids such as specifically $BF_3 \cdot ET_2O$ complex. Hydrogen chloride is convenient to use and promotes good yields, hence is preferred as the acid.

Particularly desirable ketals for use in our process are those in which the ketal group is part of the ring structure. Upon cleavage of the bond to methylenic carbon these ketals afford compounds having an ester group replacing the ether groups and a cyano group instead of the methylenic carbon atom, these groups being joined by a chain of atoms from the original ring structure. Such cyclo ketals will ordinarily have an original ring size in the range of from 4 ring members to 12 ring members; but they can have still larger rings.

Especially suitable starting materials are the symmetrical cycloalkanone ketals having from 4 to 12 carbon atoms in the ring. By "symmetrical" cyclo ketals we intend to designate ketals from those cyclo ketones wherein the ring is unsubstituted or is identically substituted in both directions around the ring, starting at the keto group. As discussed above in connection with equation (1), only one species of cyclo enol ether can be formed from such symmetrical ketal and only one cyano ester is formed by our process using such ketal as starting material. In particular, these ketals can be such as have a $C_1$–$C_{12}$ primary alkyl radical attached to at least one of the oxygen atoms of the ketal group. Those most commonly employed will have two alkyl radicals both of the same carbon content, suitably ethyl, normal propyl, or primary (normal and/or iso-) butyl.

The following examples illustrate both the use of enol ether as such as starting material and also the use of ketal as starting material. By tests using both these starting materials, with the amount of added alcohol adjusted to provide the same equilibrium mixture per equation (1), we have established that these starting materials are fully equivalent. The examples are illustrative of our invention and of the best mode contemplated by us for carrying out the invention; but the invention is not intended to be limited to all details of the examples. The examples utilize batch procedures, but it is to be understood that these are susceptible to modification to make them semicontinuous or continuous.

In the examples, all quantities stated as "parts" are molar parts unless otherwise specified.

Example 1

(A) 500 molar parts of dry sulfur dioxide were distilled into a glass vessel equipped with a Dry-Ice condenser, an addition funnel, and a mechanical agitator. A solution of 25 parts of cyclohexanone diethyl ketal in 100 parts of dry ethanol was added, followed by the addition of a solution of 1 part of dry hydrogen chloride in 10 parts of dry ethanol.

The addition funnel was charged with a solution of 27.5 parts of ethyl nitrite in 50 parts of dry ethanol, the 10% molar excess being to compensate for losses by evaporation. The reaction was effected by the dropwise addition of the nitrite solution into the agitated reaction mixture, at atmospheric pressure under reflux at a temperature of about −10° C. After the addition of the nitrite solution was complete, the agitation was continued to assure that all of the ketal (formed in situ from the enol ether) had reacted. The extent of reaction was determined by periodic analysis of the reaction mixture by gas chromatography. When the reaction had ended, the acid catalyst was neutralized by the addition of a solution of 1 part of sodium ethoxide in 10 parts of dry ethanol, and the sulfur dioxide and ethanol were removed by distillation under reduced pressure. The yield was determined by running a gas chromatograph of an aliquot of the products in standard solvent (e.g. decane) vs. a like solution of known concentration. The product was identified as ethyl 5-cyanopentanoate, obtained in about 93 percent yield on the enol ether. This product has a boiling point of 98° C. at 1.2 mm. pressure.

(B) Cyclohexene-1-ol ethyl ether was employed as starting material using the procedure of this Example 1, Part (A), except that to maintain the same molar proportion of ethoxy groups in the reaction mixture as that of Part (A), the quantity of ethanol added was increased to 125 molar parts thus compensating for 25 molar parts introduced in the ketal in addition to the quantity present in the cyclohexene-1-ol ethyl ether starting material of this Example 1(B). The results were substantially identical to those of Example 1(A).

(C) Cyclohexene-1-ol methyl ether and cyclopentene-1-ol ethyl ether were employed as starting materials, and were converted into the corresponding ω-cyano ethyl esters in presence of ethanol as the alcohol added, using the same procedure as in Example 1(B), and with generally similar results.

Example 2

(A) Comparison: When we attempted to cleave cyclohexanone dimethyl ketal using methanol as the added alcohol under otherwise the conditions of Example 1 Part (A) above, no reaction was obtained. This dimethyl ketal is relatively stable under these experimental conditions in presence of methanol and so failed to provide effective concenrtation of an enol ether in this experiment.

(B) When cyclohexanone dimethyl ketal was tested using the procedure of Example 1 Part (A) above including use of ethanol as the added alcohol, the reaction took the same course as in Example 1, Part (A) and formed the same omega-cyano ethyl ester product. This test in comparison to Part (A) of this Example 2 further verifies that ketal starting materials provide enol ethers under our reaction conditions and that these enol ethers are the effective reactants in our process.

Examples 3 Through 10

The same procedure as that described for Example 1(A) was applied to effect cleavage of other cyclo ketals, as tabulated in Table I.

Examples 11 Through 15

The ketals of open chain ketones were subjected to the same conditions as given for Example 1(A), to effect cleavage as tabulated in Table II.

TABLE I.—CLEAVAGE OF CYCLO KETAL STARTING MATERIALS

| Example | Ketal starting material | Cyanoalkanoic acid ester product identified | Yield (percent theory) |
|---|---|---|---|
| (A) Symmetrical cyclo ketals | | | |
| 3 | 1,1-diethoxycyclopentane | $CN(CH_2)_3COOC_2H_5$ | 70 |
| 4 | 1,1-diethoxycyclooctane | $CN(CH_2)_6COOC_2H_5$ | 90 |
| 5 | 1,1-diethoxycyclododecane | $CN(CH_2)_{10}COOC_2H_5$ | 92 |
| 6 | 1,1-diethoxy-4-t-butylcyclohexane | $CNCH_2CH[C(CH_3)_3]CH_2CH_2COOC_2H_5$ | 93 |
| 7 | 1,1-diethoxy-4-methylcyclohexane | $CNCH_2CH(CH_3)CH_2CH_2COOC_2H_5$ | 92 |
| (B) Unsymmetrical cyclo ketals | | | |
| 8 | 1,1-diethoxy-2-methylcyclohexane | (I) $CH(CH_2)_3CH(CH_3)COOC_2H_5$ (and $CH_3C(=NOH)(CH_2)_4COOC_2H_5$) | 80 (I) |
| 9 | 2,2-diethoxy-1,7,7-trimethylnorbornane | (I) 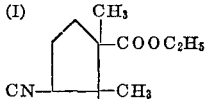 (and camphor and $(C_2H_5O)_2SO$) | 59 (I) |
| 10 | 3,3-diethoxy-17-acetoxy-5-α-androstane | 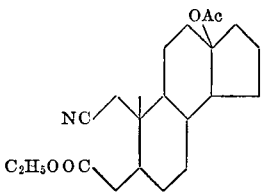 | 60 |

TABLE II.—CLEAVAGE OF OPEN CHAIN KETAL STARTING MATERIALS

| Example | Ketal starting material | Products identified | Yield (percent of theory) |
|---|---|---|---|
| (A) Symmetrical ketals | | | |
| 11 | 4,4-diethoxyheptane | $CH_3(CH_2)_2COOC_2H_5$ | 98 |
| 11 | do | $CH_3(CH_2)_4CN$ | 90 |
| 12 | 7,7-diethoxytridecane | $CH_3(CH_2)_5COOC_2H_5$ | 98 |
| 12 | do | $CH_3(CH_2)_4CN$ | 90 |
| (B) Unsymmetrical ketal | | | |
| 13 | (a) 2,2-diethoxyheptane | $CH_3(CH_2)_4COOC_2H_5$ | 48 |
| 13 | (b) The corresponding enol ethers gave essentially the same results. | $CH_3COOC_2H_5$ | 49 |
| 13 | do | $CH_3(CH_2)_3CN$ | 48 |
| 13 | do | HCN (reacts further) | |
| (C) Ketal group adjacent to (i) tertiary carbon, (ii) aromatic carbon | | | |
| 14 | (i) 2,2-diethoxy-3,3-dimethylbutane | $(CH_3)_3CCOOC_2H_5$ | 85 |
| 14 | do | HCN (reacts further) | |
| 15 | (ii) 1,1-diethoxy-1-phenylhexane | $C_6H_5COOC_2H_5$ | 85 |
| 15 | do | $CH_2(CH_2)_3CN$ | 80 |

Examples 16 Through 19

Cyclohexanone ketals having various alkoxy groups were employed as starting materials in the procedure of Example 1(A) except that the nitrite and added alcohol contained the same alkyl radical as in the ketal used:

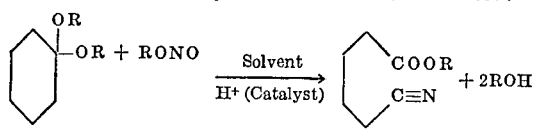

Results are tabulated in Table III.

TABLE III.—VARIOUS DIALKOXYCYCLOHEXANES

| Example | Alkyl radical | 5-cyano-pentanoic acid ester yield, (percent of theory) |
| --- | --- | --- |
| 16 | Ethyl | 93 |
| 17 | n-Propyl | 93 |
| 18 | n-Butyl | 92 |
| 19 | i-Butyl | 90 |

Examples 20 Through 26

Various acids were used, as the catalyst, instead of HCl of Example 1(A), using otherwise the same procedure as in Example 1(A). The results are tabulated in Table IV.

TABLE IV.—VARIOUS ACID CATALYSTS

| Example | Acid catalyst | Ethyl 5-cyano-pentanoate yield (percent of theory) |
| --- | --- | --- |
| 20 | HBr | 93 |
| 21 | $H_2SO_4$ | 74 |
| 22 | $HClO_4$ | 30 |
| 23 | $p\text{-}CH_3C_6H_4SO_3H$ | 78 |
| 24 | $CH_3SO_3H$ | 80 |
| 25 | $BF_3\cdot(C_2H_5)_2O$ | 50 |
| 26 | Polyphosphoric acid | 60 |

Examples 27 Through 29

Instead of sulfur dioxide as used in Example 1(A), other polar aprotic solvents were used, under otherwise the conditions of Example 1(A) except as noted. Results are tabulated in Table V.

TABLE V.—VARIOUS POLAR APROTIC SOLVENTS

| Ex. | Solvent | Product | Temp. (° C.) | Yield (percent of theory) |
| --- | --- | --- | --- | --- |
| 27 | Sulfolane [1] | $CN(CH_2)_4COOC_4H_9$ | (a) 0 / (b) 25 | 80 / 80 |
| 28 | Nitromethane | $CN(CH_2)_4COOC_2H_5$ | 0 | 75 |
| 29 | Nitrobenzene | $CN(CH_2)_4COOC_2H_5$ | 5–10 | 65 |

[1] The alkyl radicals of the ketal, the nitrite, and the added alcohol were butyl. Runs made at 0° C. and at room temperature gave essentially identical results.

The nitrosating agent is preferably an alkyl nitrite such as methyl nitrite, ethyl nitrite, isopropyl nitrite, n-propyl nitrite, n-butyl nitrite, t-butyl nitrite, etc. If desired, the alkyl nitrite can be generated in situ, for example by the reaction of sodium nitrite with a mineral acid in the presence of an alcohol, and by the reaction of various nitrosating reagents with the alcohol used as co-solvent in the reaction system. Such nitrosating agents can be nitrosyl halides, nitrosyl sulfuric acid, nitrosyl formate, nitrosyl acetate, nitrosyl fluoroborate, etc. The alkyl nitrite may also be formed by reaction of an alcohol with nitrous acid, $N_2O_3$, $NO + NO_2$, $NO + O_2$, etc. In the latter series water is formed as a by-product and should be removed from the system, preferably before the ketone acetal is introduced.

When an alkyl nitrite is formed in situ by reaction with nitrosyl halides, nitrosyl sulfuric acid, etc., no acid catalyst is required since an acid is a by-product of the reaction.

$$NOCl + C_2H_5OH \rightarrow C_2H_5ONO + HCl$$

Example 30

A run was carried out using the ethyl ether of cyclohexene-1-ol as starting material (50 molar parts) in about 1550 molar parts of liquid sulfur dioxide and 75 molar parts of ethanol. Nitrosyl chloride gas was added slowly to the reaction mixture during about 30 minutes with agitation and at temperatures rising during the addition of the nitrosyl chloride from about (—25° C.) to about (—10° C.)

The sulfur dioxide was evaporated from the product, and chloroform was added and evaporated off to strip out the last of the sulfur dioxide. The brown, semi-solid product was neutralized by adding cold water and excess sodium carbonate, and was extracted into chloroform.

A gas chromatographic analysis of the solution showed the product to be a mixture in which one of the three most abundant components was identified as "ester nitrile," i.e. ethyl 5-cyanopentanoate.

We claim:

1. A process for cleavage of a bond in a ketal, joining the ketal group and a methylenic carbon atom, which process comprises: forming a reaction mixture by providing such ketal, in which any substituents are aprotic, in an anhydrous liquid reaction medium comprising an effective proportion of a polar aprotic solvent inert per se at the reaction temperature to said ketal; and by providing in said reaction medium: (1) nitrous acid ester in amount not greater than about two molar equivalents per mol of unreacted ketal provided; (2) acid capable of exchanging its anion with the ester group of said nitrous acid ester under the reaction conditions, in total amount not greater than about one equivalent per mol of total nitrite provided in the reaction mixture; and (3) a primary alcohol containing at least two carbon atoms in amount including such as is formed in the reaction and such as is added to the mixture, of at least about ½ equivalent per mol of ketal provided in the reaction mixture; and subjecting the reaction mixture to temperature in the range between (—70° C.) and the boiling point of the solvent under the prevailing pressure, and time sufficient for producing reaction in said reaction mixture at the said bond with cleavage thereof and formation of a cyano group and an ester group at the point of cleavage.

2. Process of claim 1 wherein said ketal is saturated and said bond is part of a chain or ring of carbon atoms; said solvent is of the group consisting of sulfur dioxide, organic sulfones, and organic nitro compounds and is present in amount of at least about half the weight of the reaction mixture; the amount of unreacted nitroso group present in the reaction mixture does not exceed the equivalent of the unreacted ketal plus enol ether therein; the total amount of acid provided is in the range of about 1 equivalent to about 10 equivalents per 100 mols of total nitrite provided in the reaction mixture; and the amount of such primary alcohol provided in the reaction mixture by being formed and by being added is at least about 2 mols per mol of ketal provided in the reaction mixture.

3. Process of claim 2 wherein said ketal is provided in situ in the reaction mixture by addition of an enol ether as starting material to the reaction mixture.

4. Process of claim 2 wherein said ketal is provided in the reaction mixture by addition of such ketal as starting material to the reaction mixture.

5. Process of claim 2 wherein said aprotic solvent is sulfur dioxide, said acid is hydrogen chloride, and the reaction temperatures are in the range between (—20° C.) and (+50° C.).

6. Process of claim 5 wherein the said bond in said ketal or enol ether is part of a carbocyclic ring structure.

7. Process of claim 6 wherein said ketal or enol ether is symmetrical and has from 4 to 12 carbon atoms in the ring.

8. Process of claim 7 wherein at least one of the alcohol groups of said ketal or enol ether has a $C_1$–$C_{12}$ primary alkyl radical attached to the oxygen atom.

9. Process of claim 8 wherein the starting material is cyclohexanone dialkyl ketal or cyclohexenol alkyl ether and the alcohol groups of the ketal or enol ether, and of the nitrous acid ester, and of the added primary alcohol are all of the same carbon content and are an ethyl, a normal propyl, or a primary butyl radical.

References Cited

UNITED STATES PATENTS

| | | | |
|---|---|---|---|
| 2,752,375 | 6/1956 | Acker | 260—404 |
| 2,870,200 | 1/1959 | Kharasch et al. | 260—465.4 X |
| 2,905,712 | 9/1959 | Braunwarth et al. | 260—465.4 X |

OTHER REFERENCES

Ogloblin et al., C.A., *64* (1966) page 3343.
Ogloblin et al., C.A., *72* (1970), page 327, section 78319s.

JOSEPH P. BRUST, Primary Examiner

U.S. Cl. X.R.

260—404, 464, 465 R, 465 D, 465.1, 476 R, 482 R, 495, 496.